United States Patent [19]

Focke et al.

[11] Patent Number: 4,708,704
[45] Date of Patent: Nov. 24, 1987

[54] PROCESS FOR PRODUCING PACKS WITH ROUNDED OR BEVELLED EDGES

[75] Inventors: Heinz Focke, Verden; Hugo Mutschall, Kirchlinteln, both of Fed. Rep. of Germany

[73] Assignee: Focke & Co. (GmbH & Co.), Verden, Fed. Rep. of Germany

[21] Appl. No.: 854,958

[22] Filed: Apr. 22, 1986

[30] Foreign Application Priority Data

May 2, 1985 [DE] Fed. Rep. of Germany ....... 3515775

[51] Int. Cl.$^4$ ............................................... B31B 3/28
[52] U.S. Cl. ........................................ 493/151; 493/162; 493/176; 493/395; 493/408; 493/911
[58] Field of Search ............... 493/151, 160, 161, 162, 493/175, 176, 178, 395, 396, 397, 405, 408, 409, 418, 466, 910, 911, 121, 125, 126, 128, 130, 132

[56] References Cited

U.S. PATENT DOCUMENTS

| | | | |
|---|---|---|---|
| D. 279,507 | 7/1985 | Schechter et al. | D27/47 |
| 487,967 | 12/1892 | Roberts | 493/162 |
| 1,324,578 | 12/1919 | Bard | 493/910 |
| 1,905,334 | 4/1933 | Bicker | 493/175 |
| 3,068,760 | 12/1962 | Gross | 493/175 |
| 4,020,988 | 5/1977 | Kipp | 229/106 |
| 4,084,393 | 4/1978 | Focke | 493/911 |
| 4,349,345 | 9/1982 | Bodendoerfer | 493/295 |
| 4,551,126 | 11/1985 | Johnson et al. | 493/418 |
| 4,562,687 | 1/1986 | Green | 493/151 |

FOREIGN PATENT DOCUMENTS

| | | | |
|---|---|---|---|
| 517301 | 1/1931 | Fed. Rep. of Germany | 493/183 |
| 1347188 | 11/1963 | France | 493/162 |
| 550665 | 1/1943 | United Kingdom | 493/148 |

Primary Examiner—Frederick R. Schmidt
Assistant Examiner—William E. Terrell
Attorney, Agent, or Firm—Sughrue, Mion, Zinn, Macpeak & Seas

[57] ABSTRACT

Process and apparatus for forming cigarette packs having rounded or beveled longitudinal edges includes forming the contoured edges on a flat blank at a shaping station as a preliminary shaping step. The shaping station includes a shaping mandrel or plate having rounded or beveled edges and shaping rollers or strips for wrapping the blank about the plate to produce the desired longitudinal edges contours.

10 Claims, 19 Drawing Figures

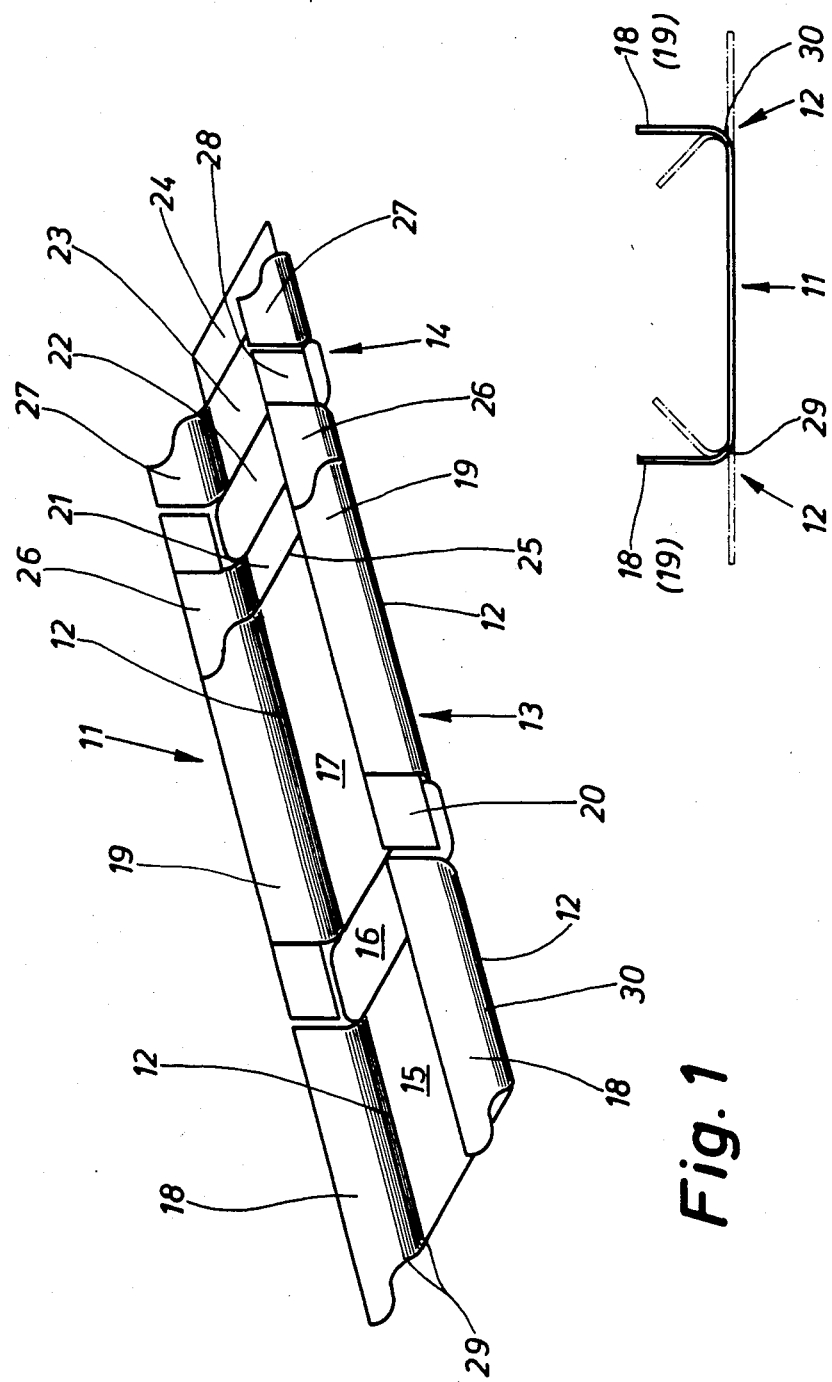

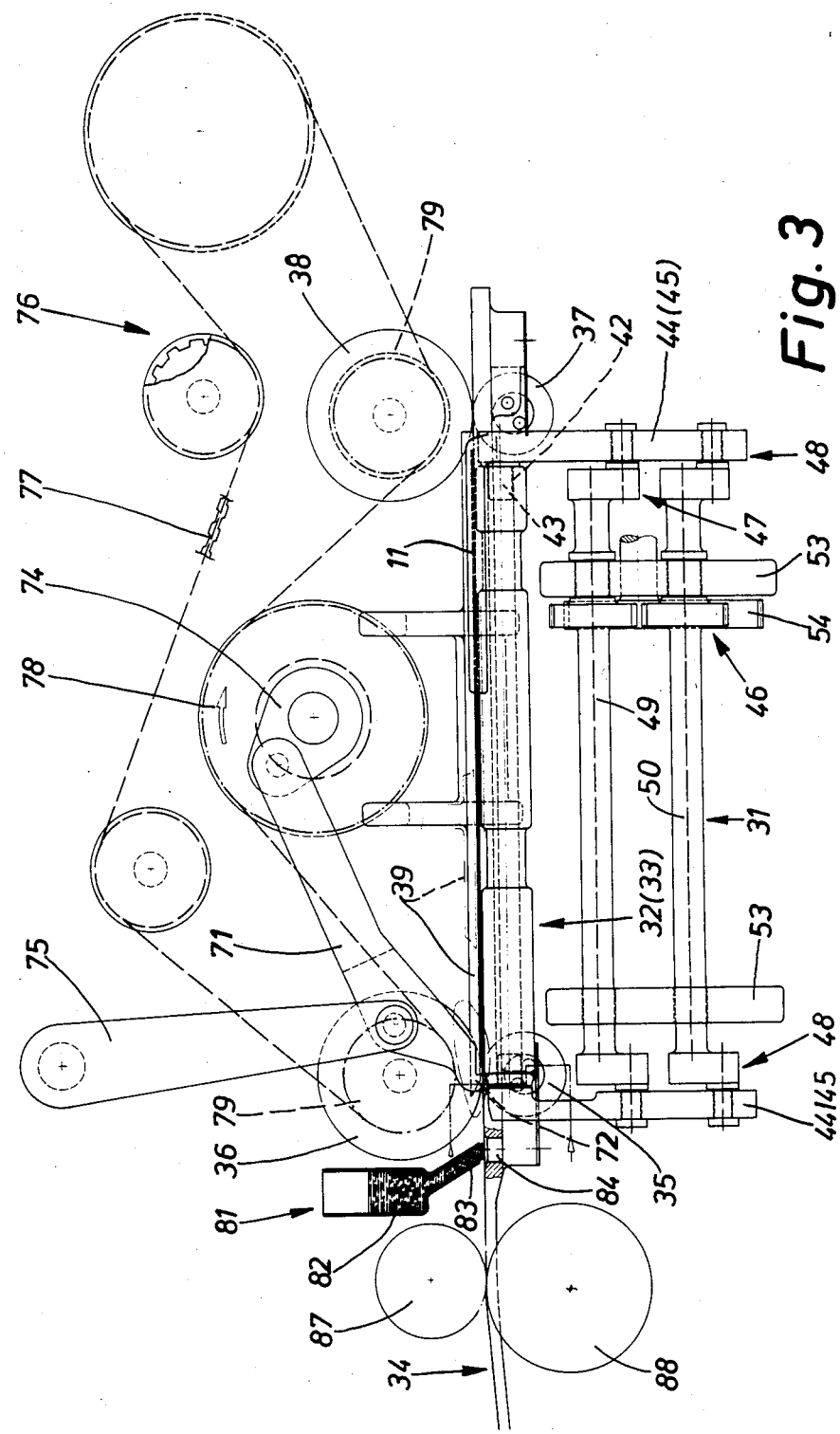

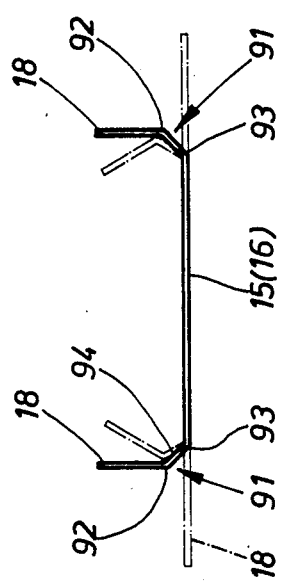
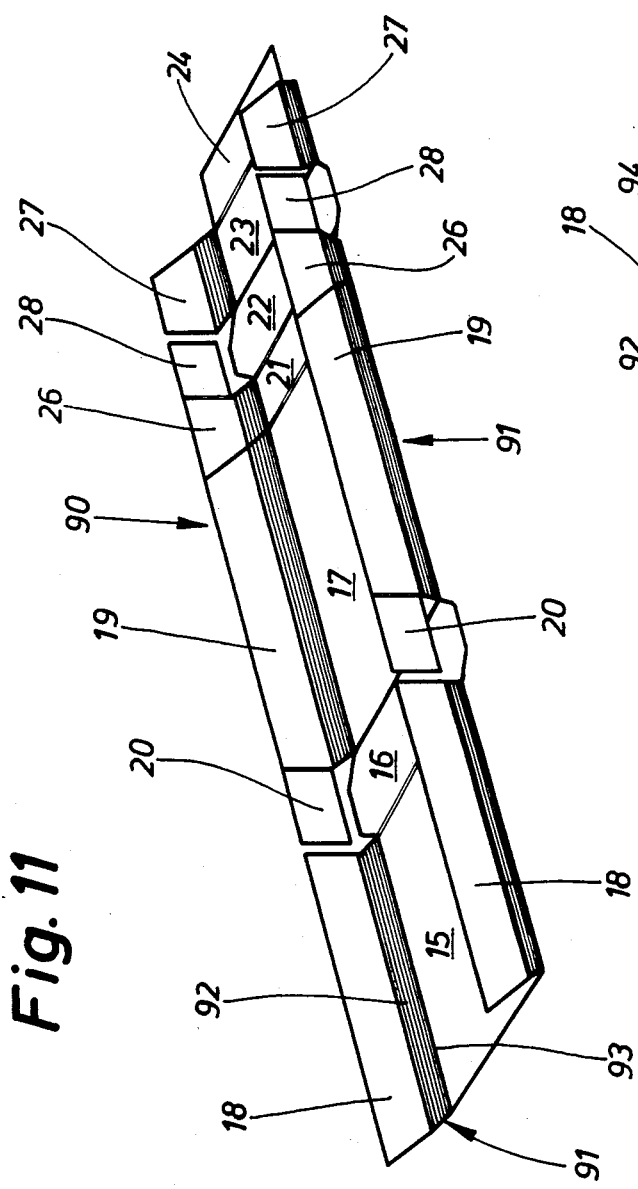
Fig.11
Fig.12

PROCESS FOR PRODUCING PACKS WITH ROUNDED OR BEVELLED EDGES

BACKGROUND OF THE INVENTION

The invention relates to a process for producing essentially cuboid packs, especially cigarette packs of the hinge-lid type, consisting of a bottom wall and top wall, (narrow) side walls and a front and a rear wall. The invention also relates to an apparatus for carrying out the process.

SUMMARY OF THE INVENTION

The invention is concerned with a development in the design of hinge-lid packs of this type. Its particular feature is that selected edges which are right-angled on known packs are rounded or bevelled (polygonal), in particular according to the dimensions (diameter) of the cigarettes.

The object on which the invention is based is to provide a process and an apparatus for producing packs with round edges or bevelled (longitudinal) edges.

To achieve this object, the process according to the invention is characterized in that, to form rounded or bevelled longitudinal edges in the region between the front or rear wall on the one hand and the side walls on the other hand, a spread-out blank is shaped in the form of an arc or by being angled twice (in polygonal form) in the region of a respective common marginal edge strip of the front wall or rear wall, on the one hand, and of side walls or side tabs connected to them, on the other hand.

According to the invention, the round edges or bevelled edges are therefore formed on the flat blank still spread out, before the pack is otherwise shaped by means of folds, etc. At the same time, according to a further proposal of the invention, to form the round edges or bevelled edges, lateral folding tabs extending in the longitudinal direction of the blank, namely side tabs to form the side walls, are erected. Where a hinge-lid pack is concerned, lid side tabs forming part of the blank are erected in the region of the pack body at the same time as the round or bevelled edges, likewise forming round or bevelled edges in the region between the lid front wall or lid rear wall on the one hand and the lid side walls on the other hand.

The apparatus according to the invention for carrying out the process is equipped with shaping tools for erecting the lateral folding tabs of the blank (side tabs or lid side tabs). The shaping tools comprise movable folding members (folding rollers, folding strips) and counter-tools interacting with these, namely a counter-folding member designed as a preferably continuous common plate.

Further details of the invention relate to the design and mode of operation of the apparatus, especially of the folding members and counter-folding members.

Details of the process according to the invention and of the apparatus are explained in detail below with reference to an exemplary embodiment illustrated in the drawings. In the drawings:

BRIEF DESCRIPTION OF THE DRAWINGS

FIG. 1 shows a perspective side view of a blank for a hinge-lid pack, after the round edges have been formed, FIG. 2 shows an end view or a cross-section of the blank according to FIG. 1, FIG. 3 shows the apparatus in a simplified side view, FIG. 11 shows a blank similar to that of FIG. 1, alter the formation of bevelled edges (angled twice), FIG. 12 shows an end view or cross-section of the blank according to FIG. 11.

DETAILED DESCRIPTION OF THE PREFERRED EMBODIMENTS

Figure 4:
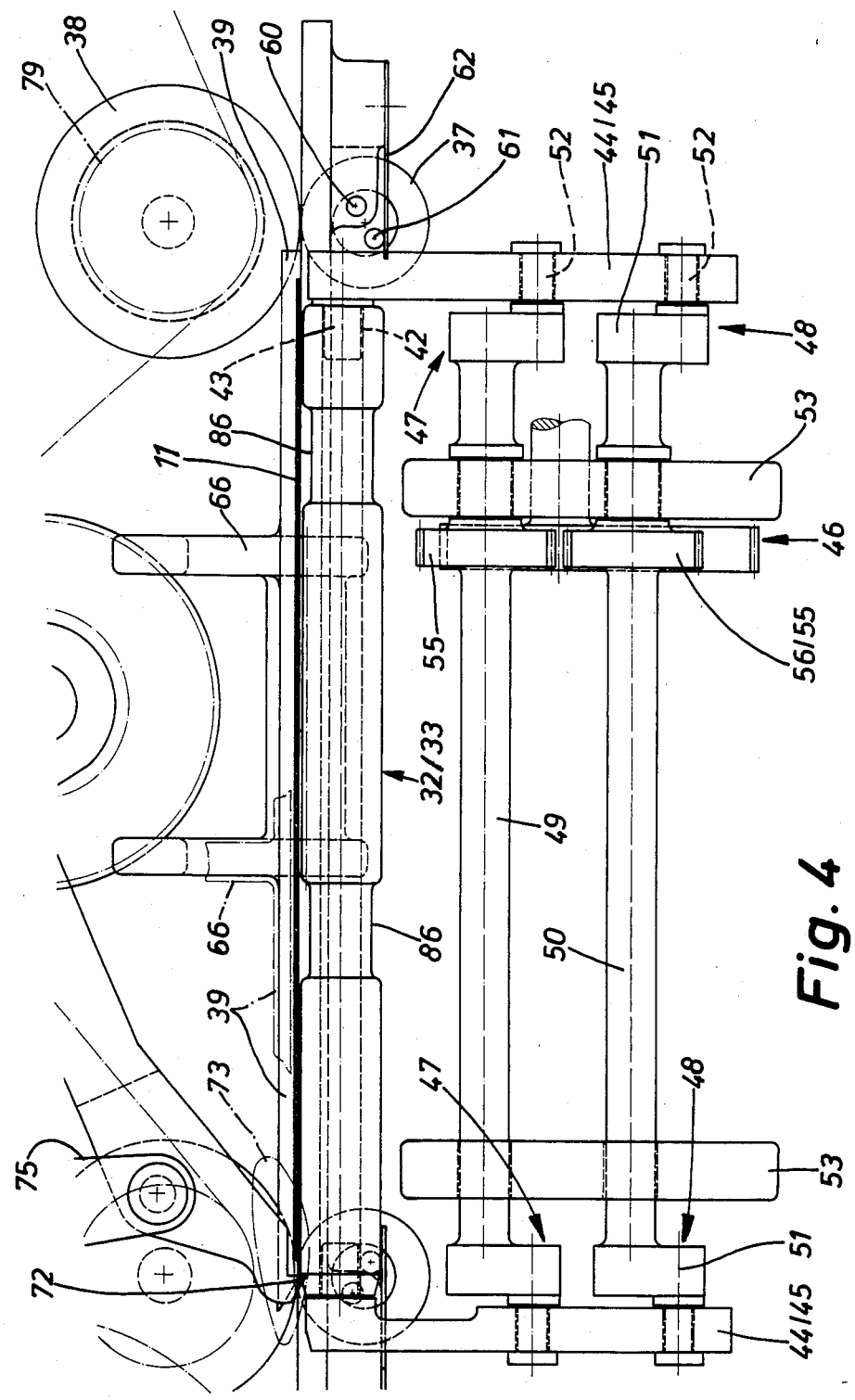
FIG. 4 shows a side view of a cut-out portion of the apparatus according to FIG. 3, on an enlarged scale.
Figure 5:
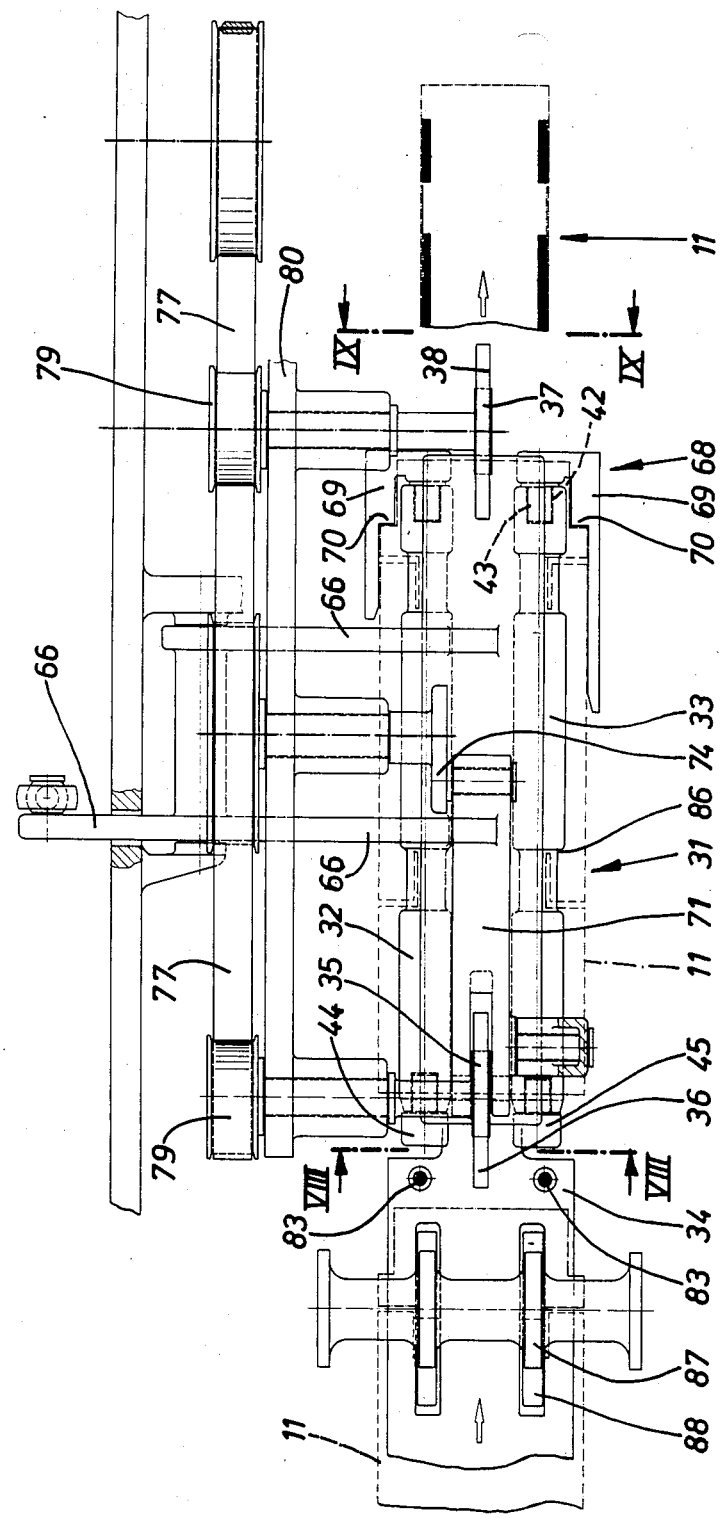
FIG. 5 shows a plan view of the apparatus according to FIG. 3.
Figure 6:
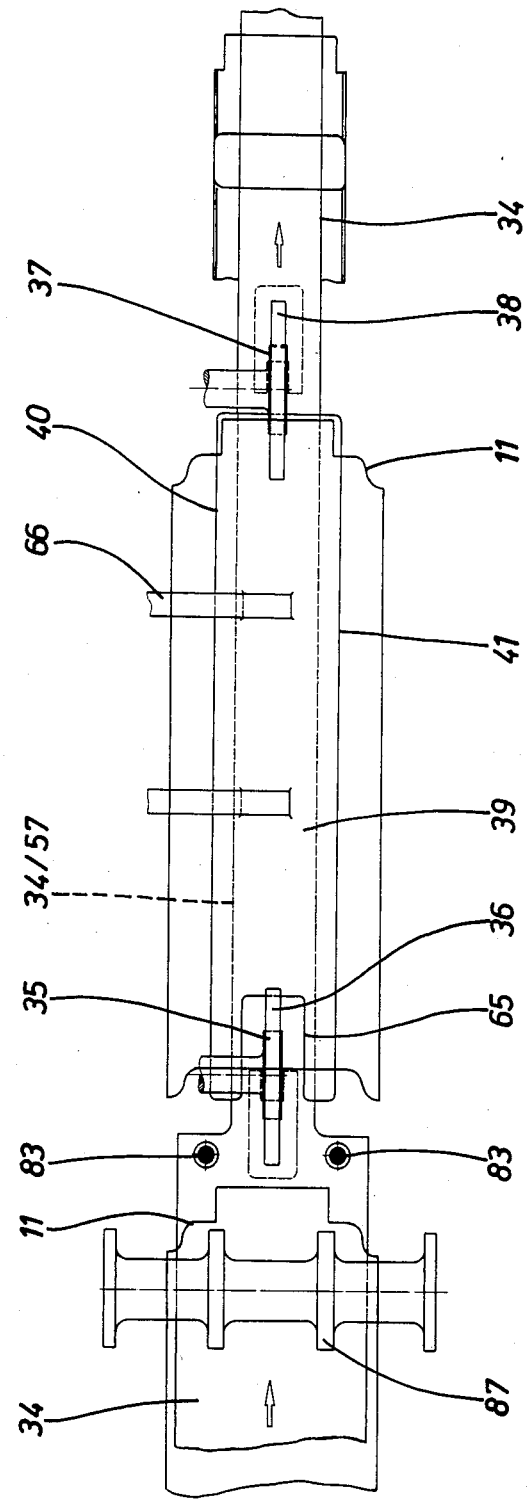
FIG. 6 shows a plan view of a representation of the apparatus which is simplified in comparison with FIG. 5 by the omission of parts of the apparatus.
Figure 7:
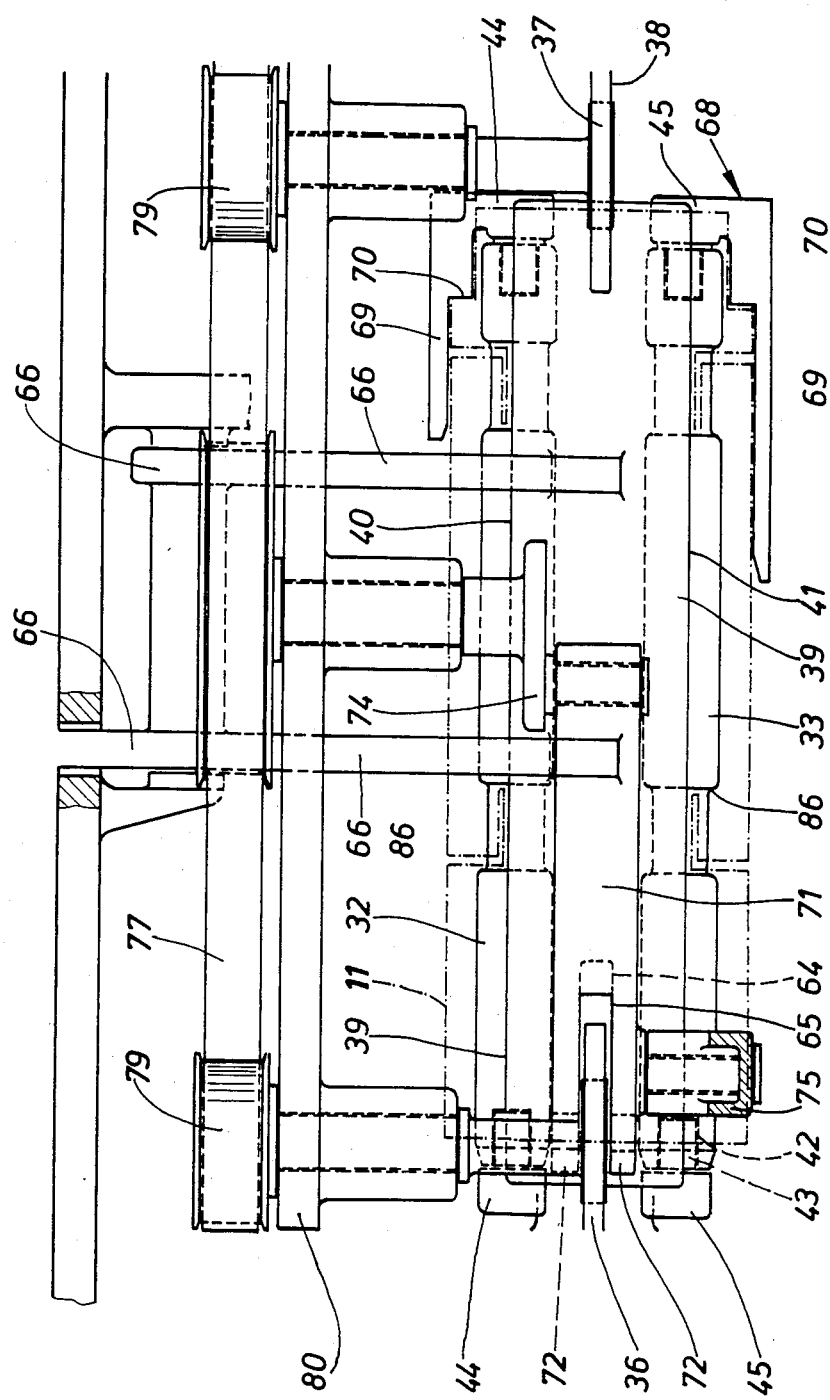
FIG. 7 shows a plan view of a cut-out portion of the apparatus according to FIG. 5, on an enlarged scale.

The exemplary embodiments of packs (blanks) and apparatuses shown in the drawings refer to two exemplary designs of (cigarette) packs of the hinge-lid type. FIGS. 1 and 2 show a blank 11 which is made with rounded longitudinal edges 12, specifically continuously in the region of a pack part 13 and a lid 14.

The blank according to FIGS. 11 and 12 shows a blank 90, constructed similarly in principle, with bevelled longitudinal edges.

The blank extended in both FIG. 1 and FIG. 11 and preformed only as regards the longitudinal edges 12, 91 forms, when ready-folded, a pack part 13 and a lid 14 in a way which is conventional per se.

Because of the design of the blank 11, a front wall 15, the bottom wall 16 and a rear wall 17 are formed successively in the longitudinal direction in the middle region, as belonging to the pack part 13. Side tabs 18 and 19 respectively adjoin the front wall 15 and rear wall 17 laterally and, when the hinge-lid pack is ready-folded, overlap one another in pairs and form side walls. In the region of the bottom wall 16, bottom corner tabs 20 are provided, although these are not joined to the bottom wall 16, but are continuations of the side tabs 19.

To form the lid 14, a lid rear wall 21, a top wall 22, a lid front wall 23 and a reinforcing tab 24 are formed successively in the longitudinal direction of the blank 11. The lid rear wall 21 is joined to the rear wall 17 of the pack part 13 by means of a hinge 25. Lid side tabs 26 and 27 are assigned to the lid rear wall 21 and lid front wall 23 respectively in a similar way to the side tabs 18 and 19. A lid corner tab 28 is provided in the region of the top wall 22, as an extension of each of the lid side tabs 26.

The longitudinal edges 12 or 90 each extend between the front wall 15, on the one hand, and the side tabs 18 adjoining it on both sides, on the other hand, between the rear wall 17 and the side tabs 19, between the lid rear wall 21 and the lid side tabs 26 and between the lid front wall 23 and the adjoining lid side tabs 27, on the other hand.

To form rounded longitudinal edges 12 (round edges), strip-shaped regions of material, namely edge strips 29 and 30, obtained from respective marginal regions of the walls or tabs adjoining one another, are permanently shaped in the form of an arc (in the form of a quarter-circle arc). As illustrated, the side tabs 18, 19 and lid side tabs 26, 27 are erected from the flat position of the blank 11 into an essentially vertical position (FIG. 2), to form the rounded longitudinal edges 12. At the same time, as indicated by dot-and-dash lines in FIG. 2, the above-mentioned lateral parts of the blanks 11 are moved beyond the vertical end position, i.e. are bent over. As a result of the restoring forces which are present, the side tabs 18, 19 and lid side tabs 26, 27 then move back into the vertical position. The (polygonal) longitudinal edges 91 of the pack according to FIGS. 11 and 12 are shaped in a similar way.

The blank 11 prepared in this way is then processed further in a suitable conventional packaging machine, at the same time receiving the pack contents.

The apparatus for making the rounded longitudinal edges 12 (round edges) is built into the conveyor track of the blanks 11. In the region of a shaping station 31, the above-described deformations of the lateral blank parts are carried out during a momentary stationary phase. For this purpose, shaping or embossing tools are provided in the shaping station 31. These are movable folding members and fixed counter-folding members. In the exemplary embodiment illustrated, elongated folding rollers 32 and 33 of circular cross-section are arranged laterally relative to a blank track 34. On the latter, the blank 11 is transported into the shaping station 31 and conveyed out of this. To transport the blanks 11 into the shaping station 31 and to transport them immediately after they leave the latter, rotationally driven pairs of drawing pulleys 35, 36 and 37, 38 are respectively arranged directly adjacent to the inlet side and the outlet side of the shaping station 31. The blanks 11 each run through between the drawing pulleys 35, 36 and 37, 38 assigned to one another.

Figure 8:
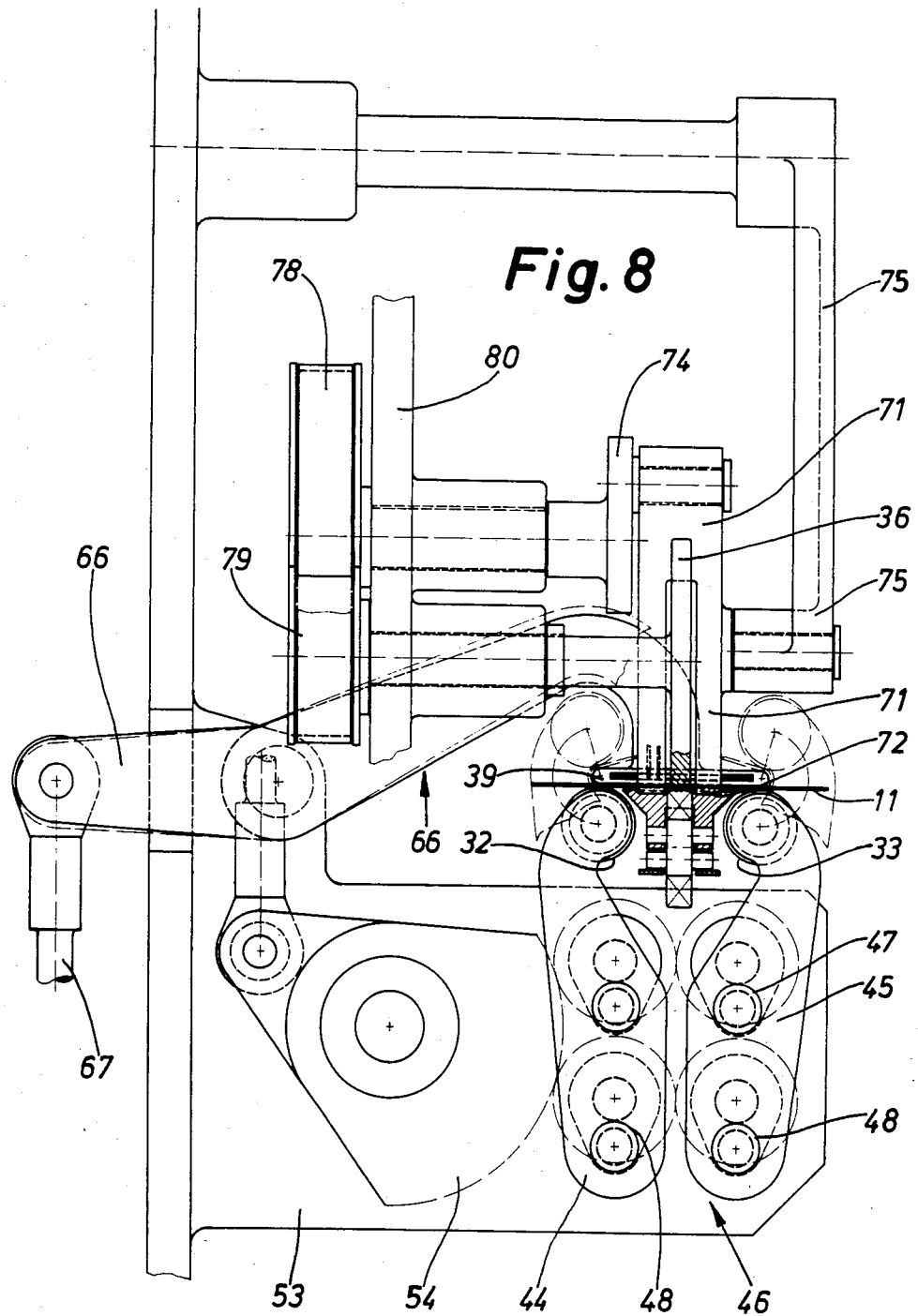
FIG. 8 shows a transverse view or cross-section in the sectional pane VIII—VIII of FIG. 5.

During shaping or folding, immovable counter-folding members are assigned to the folding rollers 32 and 33, specifically, in the present exemplary embodiment, a comtinuous, one-piece shaping plate 39 which has approximately the length of the entire blank 11 which is lowered from above onto the midle region of the latter. The shaping plate 39 serves, at the same time, for fixing the blank 11 temporarily in an exact position inside the shaping station 31. The width of the shaping plate 39 is such that the shaping margins 40 and 41, rounded (in the form of a circular arc) and extending in the longitudinal direction, can serve as a counter-shaping tool to the folding rollers 32, 33 in such a way that the edge strips 29 and 30 can be shaped round the shaping margins 40, 41, thereby being deformed arcuately. At the same time, the respective parts of the blank 11 are pressed against the shaping margins 40, 41 of the shaping plate 39 by the folding rollers 32, 33. For this purpose, these are moved out of the lower initial position according to FIGS. 8 or 9 (unbroken lines) into an upper position (dot-and-dash lines). The folding rollers 32, 53 are thereby moved round the shaping margins 40, 41 along a path in the form of a circular arc, taking with them the blank parts (side tabs 18, 19 or lid side tabs 26, 27), at the same time pressing these against the shaping margins 40, 41. Accordingly, in the initial position, the folding rollers 32, 33 are located underneath the blank 11.

In the present exemplary embodiment, the folding rollers 32 are mounted so as to be rotatable about their own longitudinal axis. For this purpose, axially directed bearing bores 42, into which a bearing journal 43 of a roller holder penetrates, are made at the ends.

In front of each end of the folding roller 32, 33, a supporting arm 44, 45 for each folding roller 32, 33 is mounted adjustably. The supporting arms 44, 45 are connected to an actuating gear 46 which produces the movement of the folding rollers 32, 33 which has already been described. To execute the exclusively translational movement of the supporting arms 44, 45, the supporting arms 44 and 45 assigned to a respective folding roller 32, 33 can be actuated by two crank mechanisms 47 and 48 attached to the end of a respective common drive shaft 49, 50. The crank mechanisms 47, 48 each consist of a crank disc 51 with a crank pin 52 which is mounted rotatably in the supporting arm 44 or 45.

The drive shafts 49, 50 are mounted in a supporting wall 53 belonging to the machine frame. The two drive shafts 49, 50 are driven to rotate to and fro by means of a toothed quadrant 54. Their drive is transmitted via gear wheels 55 to corresponding gear wheels 56 of the adjacent drive shafts. By means of this gear, the folding rollers 32, 33 always execute identical, synchronous movements. As is evident, the folding rollers 32, 33, while taking up the side tabs 18, 19 or lid side tabs 26, 27, are moved so far that these blank parts are moved beyond the vertical position almost into a horizontal position (bent over). As a result of restoring forces, the said tabs then attain the vertical position according to FIG. 2.

The blank track 34 has, at least in the region of the shaping station 31, markedly less width than the blank 11 or than the front wall 15, rear wall 17, etc of the latter. The blank track 34 consists of an elongate supporting profile 57 of a trapezoidal cross-section tapering downwards. The lower drawing pulleys 35, 37 of the pairs of drawing pulleys are mounted in the region of a lower web 58, specifically being pressed elastically against the respective upper drawing pulleys 36, 38 located opposite them. For this purpose, an inner part 59 of the drawing pulley 35 or 37 is mounted eccentrically via a supporting journal 60 in a corresponding bearing bore of the web 58. A further supporting journal 61, likewise attached to the inner part 59 eccentrically, is loaded by a spring member, namely a leaf spring 62, so as to be constantly pressed elastically upwards. An outer rotary ring 63 runs rotatably on the inner part 59. This rotary ring 63 passes through a slit orifice 64 in the supporting profile 57 and through a recess 65 in the region of the inlet side of the shaping station 31.

The shaping plate 39 is moved up and down each time only the amount of a short stroke of a few millimeters (the positions represented by unbroken lines and dot-and-dash lines in FIG. 4). To actuate it, there is a two-armed lifting lever 66 which is pivotably adjustable by means of an actuating rod 67.

Inside the shaping station 31, the blank is accommodated in a blank receptacle 68, specifically positively aligned exactly. The blank receptacle 68 consists of two angular stop pieces 69 which, matching the contours of the blank 11, surround the blank 11 laterally and so as to fit against its front side, in a region located at the front in the conveying direction. In particular, the stop pieces 69, by means of a shoulder 70, come respectively up against lid side tabs 27 projecting by means of the narrower reinforcing tab 24 and thus determine the relative position in the longitudinal direction.

Figure 9:
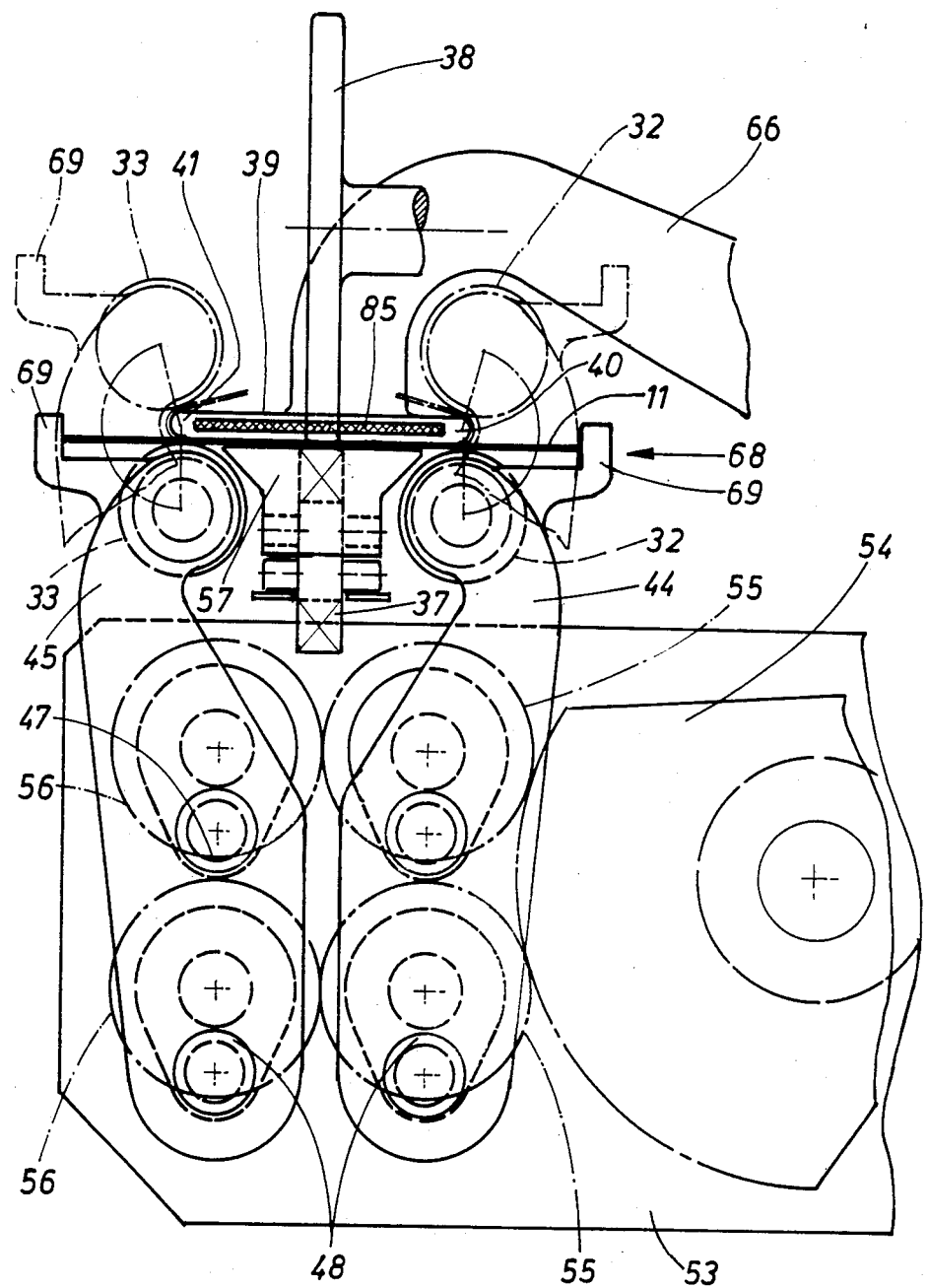
FIG. 9 shows a transverse view of part of the apparatus in the plane IX—IX of FIG. 5.
Figure 10:
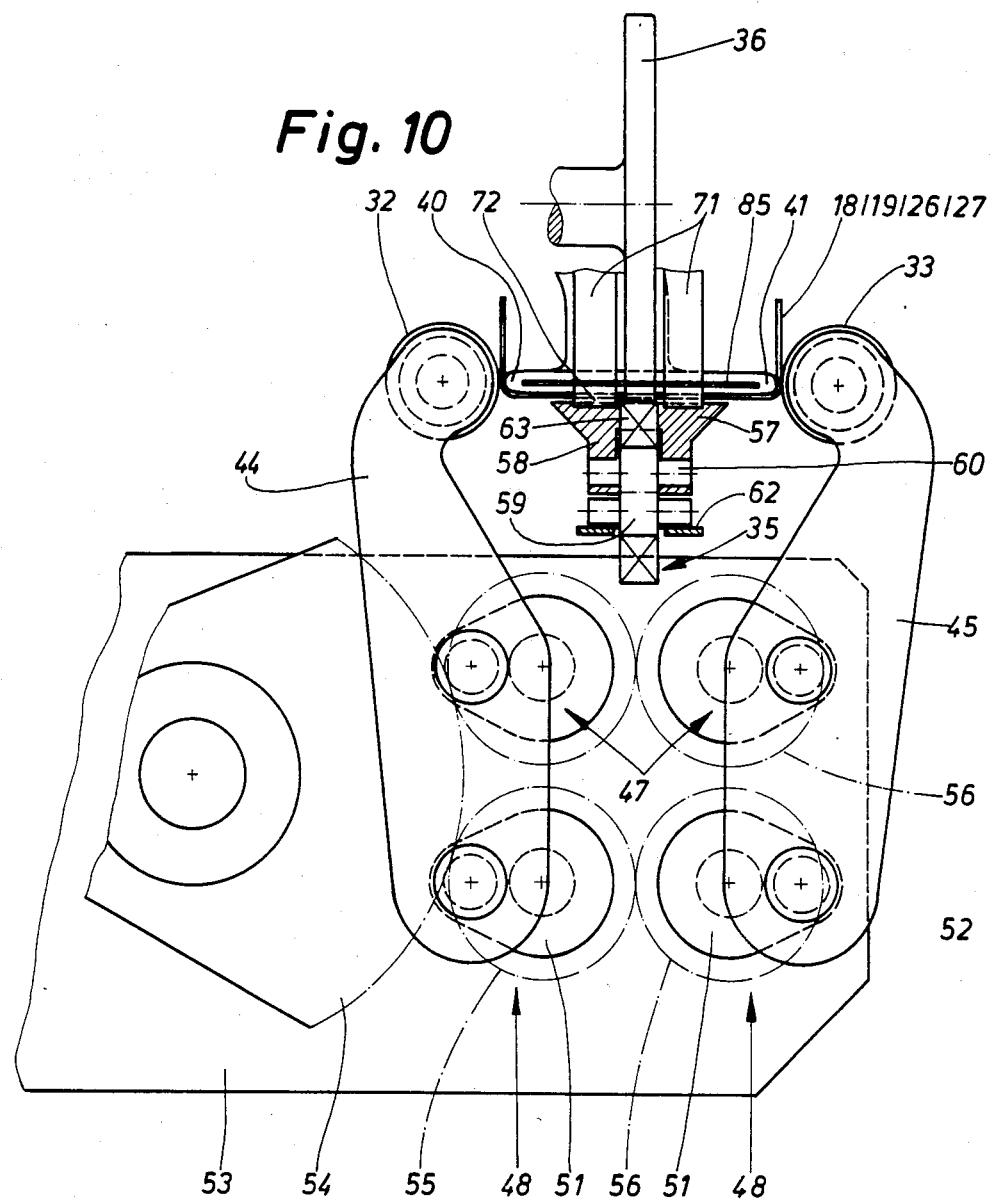
FIG. 10 shows, on an enlarged scale, a representation of a cut-out portion similar to that of FIG. 8, with the folding members in a changed position.

In the present exemplary embodiment, the stop pieces 69 are connected to the front supporting arms 44 and 45 and are consequently also lifted by means of these (FIG. 9). After the shaping plate 59 has been lowered onto the blank 11 and the latter has been fixed on the supporting profile 57 of the blank track 34, the stop pieces 69 have performed their function.

In the region of the shaping station 31, the blank 11 is disengaged from the drawing pulleys 35, 36 and 37, 38. To transport the blank 11 further after the shaping or folding operation, until it is grasped by the drawing pulley 37, 38, a special conveyor activated intermittently is provided. This consists of a gathering arm 71 which, during a conveying stroke, grasps the blank 11 on its rear side by means of an carrier lug 72 (FIG. 3) and transports the blank 11 over a short conveying distance. At the same time, the carrier lug 72 of the constantly moving gathering arm 71 moves along a low closed path of movement 73 (FIG. 4).

To execute these movements, the gathering arm 71 is driven by a constantly rotating crank 74 and is held by a pivoting arm 75 articulated adjacent to the carrier lug 72.

As is particularly evident from FIG. 3, a number of members described are moved by a common drive, in the present case by a toothed-belt drive 76. A common toothed belt 77 runs over drive pulleys and deflecting pulleys, over a crank-mechanism pulley 78 for driving the gathering arm 71 and over toothed pulleys 79 assigned to the drawing pulleys 36 and 38. The above-mentioned drive members are mounted on or in a common retaining wall 80. The movement of the gathering arm 71 is coordinated with that of the folding rollers 32, 33.

The deformability of the blank 11, consisting of thin cardboard or the like, in the region of the edge strips 29, 30 can be improved by moistening it or by coating on a layer of glue. For this purpose, in the exemplary embodiment illustrated, liquid containers 82 with an outflow channel and a transfer wick 83 arranged in the latter are located in front of the inlet side of the shaping station 31. The transfer wick 83 is permanently saturated with liquid. The bottom end rests on the blank 11 in the region of the edge strips 29, 50 during transport and thereby transfers the liquid. In the region of the transfer wick 83, the blank track 34 is provided with a bore 84, through which any drops of liquid can pass when there is no blank 11 being conveyed.

Furthermore, the deformability or the dimensional stability of the blank 11 can be improved by the application of heat. For this purpose, in the exemplary embodiment illustrated, the shaping plate 39 is provided with a flat heating element 85, for example an electrical resistor.

The mode of operation of the apparatus is such that the shaping plate 39 is lowered after a blank 11 has been conveyed into the shaping station 31. The above-described upward or shaping movement of the folding roller 32, 33 then takes place. After these have returned to the initial position, the shaping plate 39 is raised slightly. At the same time, the gathering arm 71 engages with the blank 11 by means of the carrier lug 72 and moves it further, in such a way that a front region of the blank 11 grasped by the drawing pulleys 37, 38.

In the present exemplary embodiment, the folding rollers 32, 33 are designed, in the region of the bottom corner tabs 20 and the lid corner tabs 28, with a turned groove 86 that is to say with a smaller diameter, so that there is no deformation of the blank 11 here.

Outside the region of the shaping station 31, the blanks 11 transported at suitable distances from one another in the conventional way. As evident from FIG. 3, for example, a further pair of drawing pulleys 87, 88 is arranged at a distance in front of the shaping station 31 for this purpose.

As regards the pack or blank according to FIGS. 11 and 12, the longitudinal edges 91 corresponding to the longitudinal edges 12 of he preceding exemplary embodiment are bevelled or polygonal, specifically by bending the blank 90 twice in this region. Two polygonal edges 92 and 93 are consequently obtained in the region of the entire (imaginary) longitudinal edge 91. Consequently, a blank strip 94 extending obliquely "across the corner" is obtained between the polygonal edges 92, 93. The angles formed on the one hand by this blank strip 94 and on the othe hand by the adjoining blank regions are preferably equal (135°).

Blank 90 designed thus is preferably preformed in the same way as already described and illustrated in FIGS. 11 and 12. An apparatus suitable for this, similar to that of the exemplary embodiment of FIGS. 3 to 10, is equipped with a shaping plate 95 which can be placed onto the blank 90 and of which the shaping margins 96 and 97 have angled shaping surfaces 98, 99 corresponding to the form of the blank parts to be shaped into an angular position relative to one another. Accordingly, in the present case, thereis a lower shaping surface 98 serving for shaping the blank strip 94 and a shaping surface 99 adjoining the former at an angle and intended for the adjacent blank (side tab, lid side tab, etc). The angular position of the shaping surfaces 98, 99 is such that the blank regions are broken during shaping (FIGS. 12 and 13, and in particular the angles determining the positions of the shaping surfaces are each 120°.

Here, the counter-folding members are the folding rollers 100 and 101 which have already been described in principle and are actuated in the same way and which have an elastic sheathing 102, for example made of rubber or plastic, for matching the blank parts exactly to the shaping margins 96, 97 of the shaping plate 95.

Figure 14:
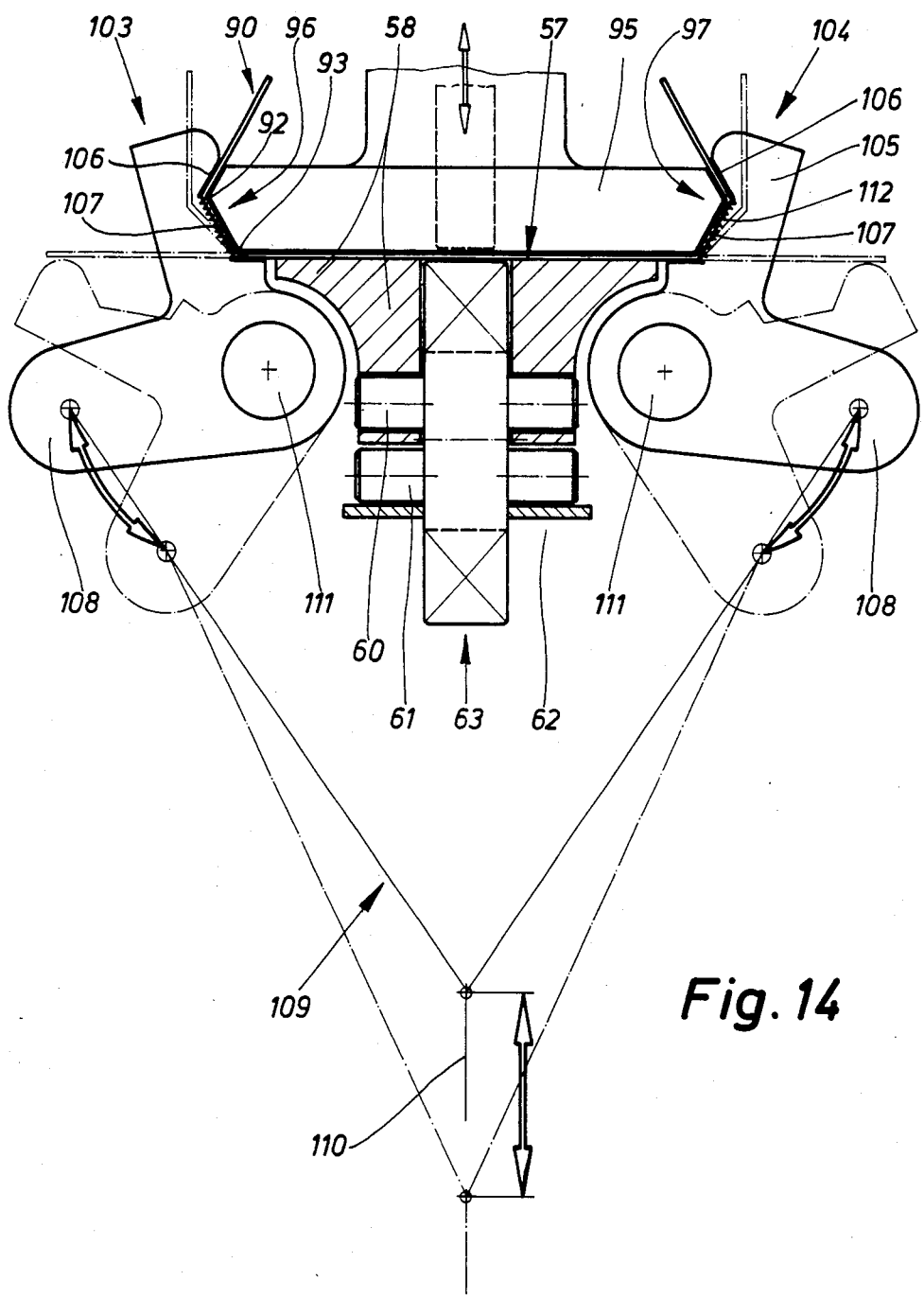
FIG. 14 shows a representation, corresponding to that of FIG. 13, of another embodiment of the apparatus for shaping blanks according to FIGS. 11 and 12.
Figure 15:
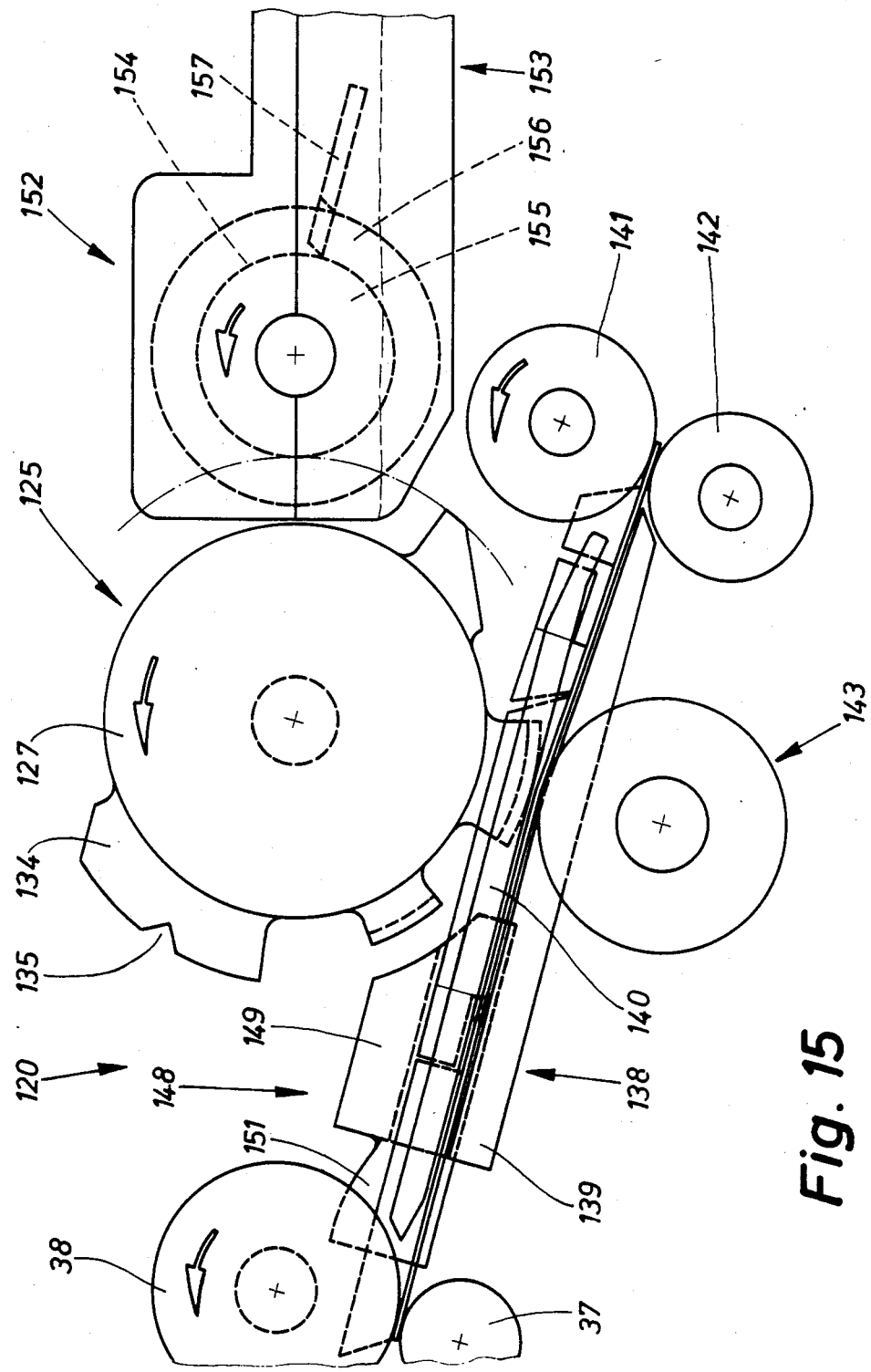
FIG. 15 shows a simplified side view of a glueing station adjoining the folding station according to FIGS. 3 to 14.

FIG. 14 shows an alternative design of the apparatus in the region of the folding and counter-folding members. The solution illustrated is intended for a blank according to FIGS. 11 and 12, that is to say with bevelled longitudinal edges 91. However, if the folding members are adapted in an appropriate way, this apparatus can also be used for the exemplary embodiment of FIGS. 1 and 2.

Figure 13:
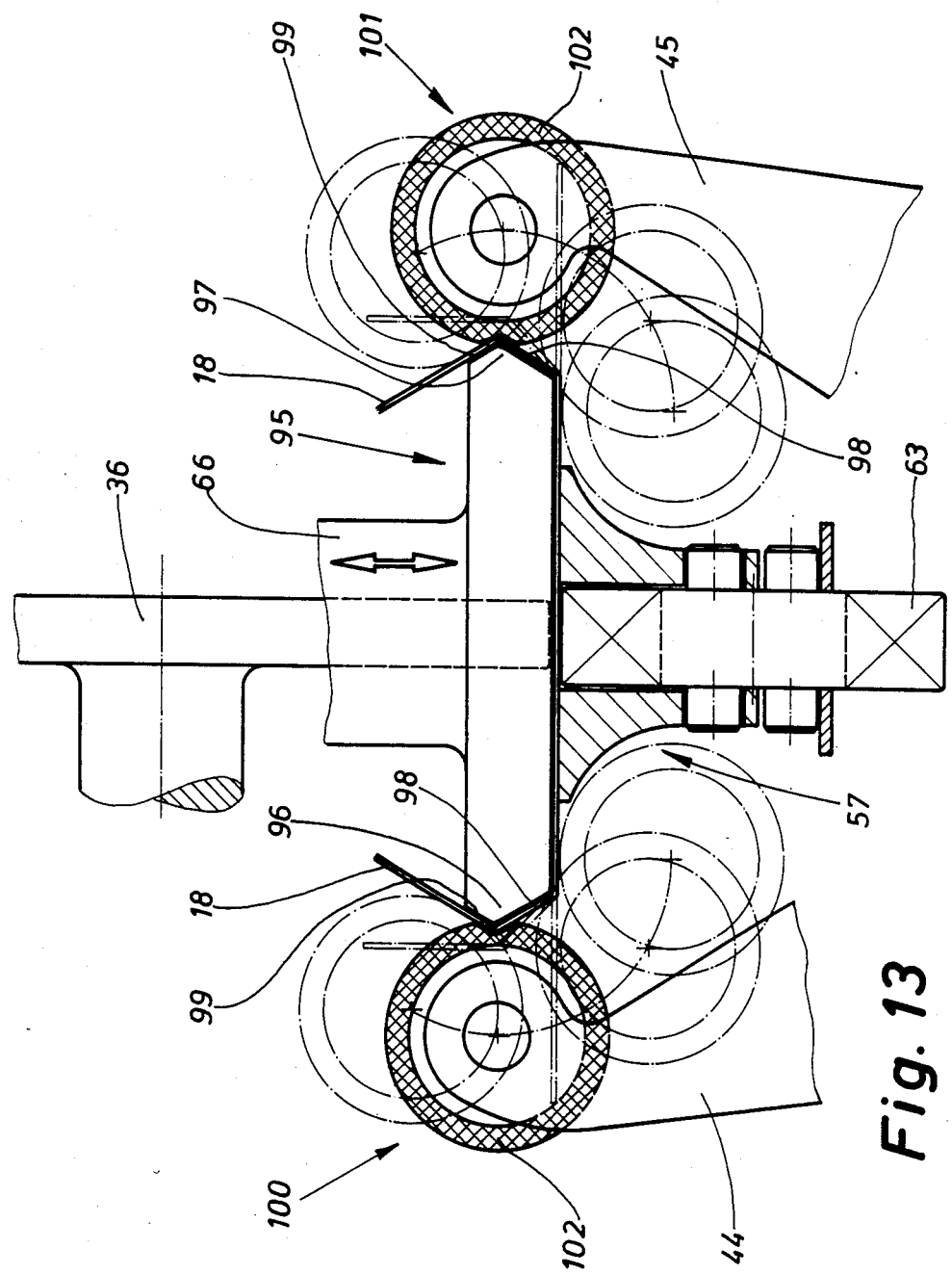
FIG. 13 shows a cross-section or end view of a detail of the apparatus for forming bevelled edges (blank according to FIGS. 11 and 12)

As in the exemplary embodiments described, here again there is a shaping plate 95 with shaping margins 96, 97 which extend in the longitudinal direction and which, in the present case, have shaping surfaces 98, 99 directed at an angle to one another, as in the exemplary embodiment of FIG. 13. Folding strips 103, 104 extending in the longitudinal or conveying direction are provided as outer counter-folding members here. These folding strips 103, 104 consist of a folding leg 105 which, on the side facing the shaping plate 95, has the profile of the shaping margins 96, 97, that is to say is provided with corresponding counter-shaping surfaces 106, 107. The folding strips 103, 104 or the folding leg 105 are pressed by means of the counter-shaping surfaces 106, 107 against the shaping margins 96, 97 of the shaping plate 95 as a result of an appropriate transverse movement, thereby shaping the blank 90. At the same time, the polygonal edges 92, 93 are formed.

On the exemplary embodiment illustrated, the folding strips 103, 104 are designed as two-armed levers, namely with an actuating leg 108 projecting sideways. The folding strips 103, 104 thus acquire a general angular cross-section.

The actuating legs 108 of the two folding strips 103, 104 are connected to a common actuating linkage 109 movable up and down, which is connected in an articulated manner to each of the actuating legs 108. Of this actuating linkage 109, only the centre lines of rods connected to one another are shown here. To execute joint pivoting movements of the folding strips 103, 104 about a central pivot bearing 111, the axis of which extends in the longitudinal direction, a central connecting rod 110 pointing downwards is moved up and down by means of a suitable drive member. In the initial position, the folding legs 105 are located directly below the plane of the (spreadout) blank 90.

In the present exemplary embodiment, the counter-shaping surface 107 assigned to the blank strip 94 is designed with longitudinal grooves 112. By means of these, corresponding grooves are made in the blank 90 in the region of the blank strip 94.

Otherwise, this apparatus is also designed in the same way as that already described.

The above-described exemplary embodiments of an arrangement for prefolding the blanks are adjoined by a glueing station 120. This serves for applying spots of glue 121 in the region of the bottom corner tabs 20, spots of glue 122 in the region of the side tabs 19 and further spots of glue 123 in the region of the reinforcing tab 24 and the lid front wall 23. Further rectangular spots of glue 124 are provided in the region of the front wall 15. All the spots of glue are applied to the inner face of the blank 11 pointing upwards.

In the exemplary embodiment of the glueing station 122 illustrated, the above-mentioned spots of glue 121 to 124 are applied by a single common member, namely by a glue roller 125. This is rotatably mounted laterally in the machine frame and is driven via a main gear wheel 126. Supporting discs 128, 129 and 130 extending in the peripheral direction are arranged at an axial distance from one another on an cylindrical roller body 127. Attached to the outer peripheries of these supporting discs 128 to 130 are glue-coating members which are brought in contact with the respective surfaces of the blank 11.

The outer supporting discs 128 and 130 are provided with glue segments 131 which are offset inwards in a step-like manner and which extend along a part periphery and serve for applying the spots of glue 122. Glue segments 132, offset in the peripheral direction, are formed on the same supporting disc 128 or 130 and serve for applying the glue spots 121.

Figure 16:
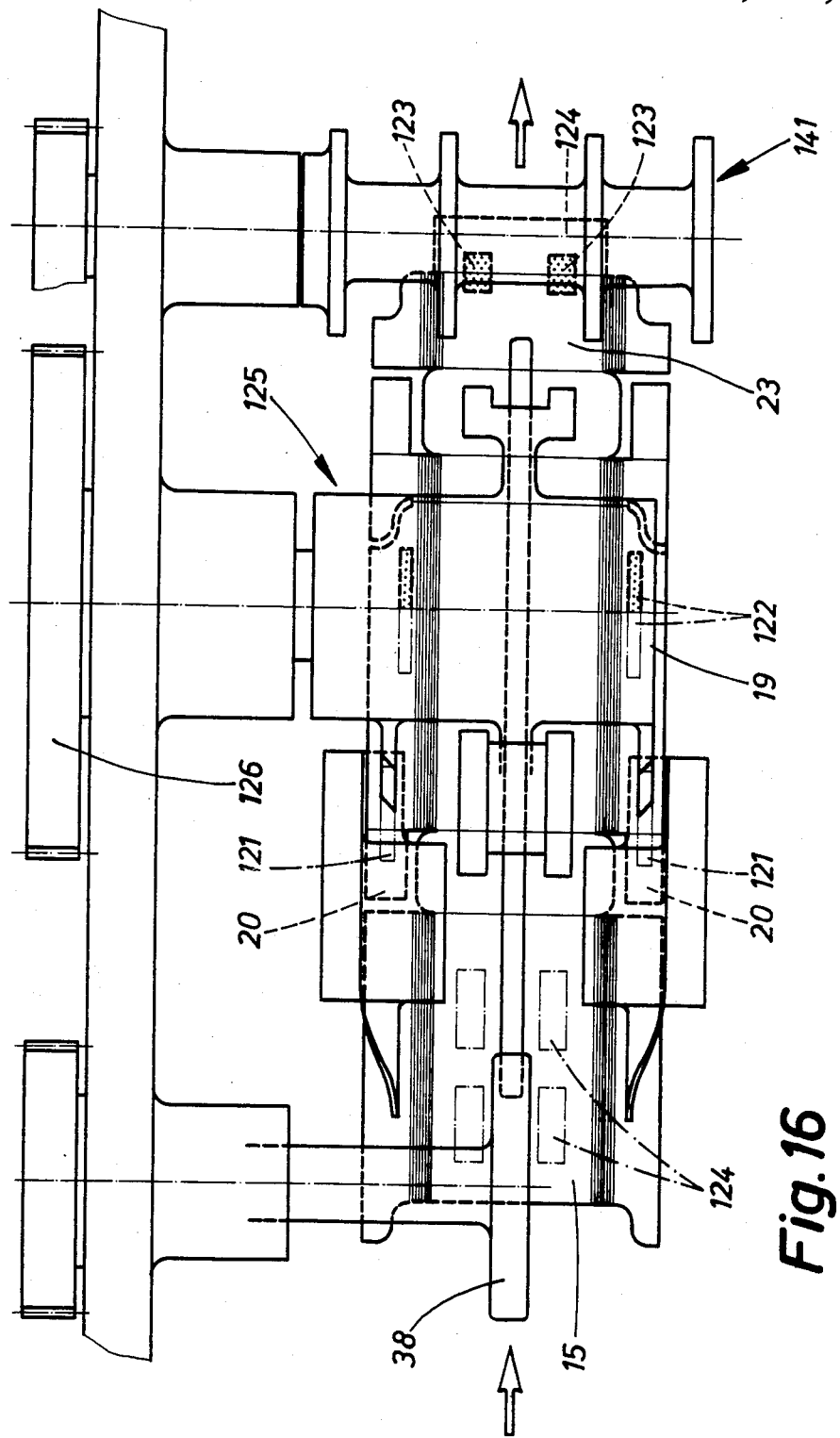
FIG. 16 shows a plan view of the glueing station according to FIG. 15.
Figure 17:
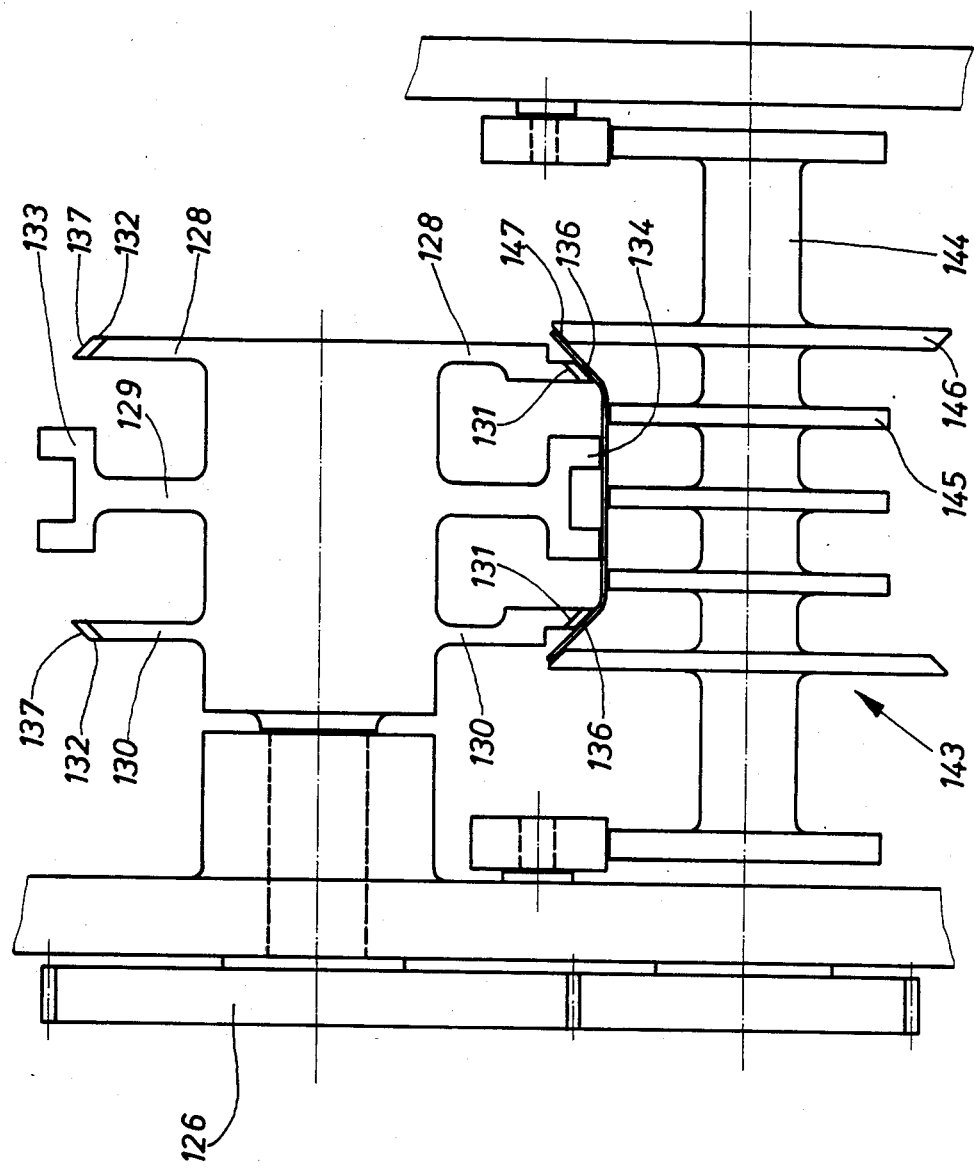
FIG. 17 shows a transverse view of the glueing station.

The glue spots 123 are applied by a U-shaped glue segment 133 with two legs. A U-shaped glue segment 134, offset in the peripheral direction, is likewise attached to the same supporting disc 129 and is divided in the peripheral direction by an indentation 135, so that this glue segment altogether forms four glue transfer surfaces. The relative positions of the glue segments 131 to 134 and their shapes and dimensions in the peripheral direction are selected so that the glue patterns shown in FIG. 16 are produced.

Whereas the glue segments 133 and 134 in the middle region of the glue roller 125 are designed with plane or cylindrical glue-coating surfaces, the glue-coating surfaces 136 and 137 of the outer glue segments 131 and 132 have a conical form, namely a form sloping obliquely outwards. These conical glue-coating surfaces 156 and 157 take effect in the region of side tabs 18, 19 or in the region of the bottom corner tab 20, while these blank parts are fixed in an obliquely raised V-shaped position. The design of the glue-coating surfaces 136, 137 and their angular position are matched to the angular position of the side tabs 18, 19, accordingly being directed approximately at an angle of 45°.

Figure 18:
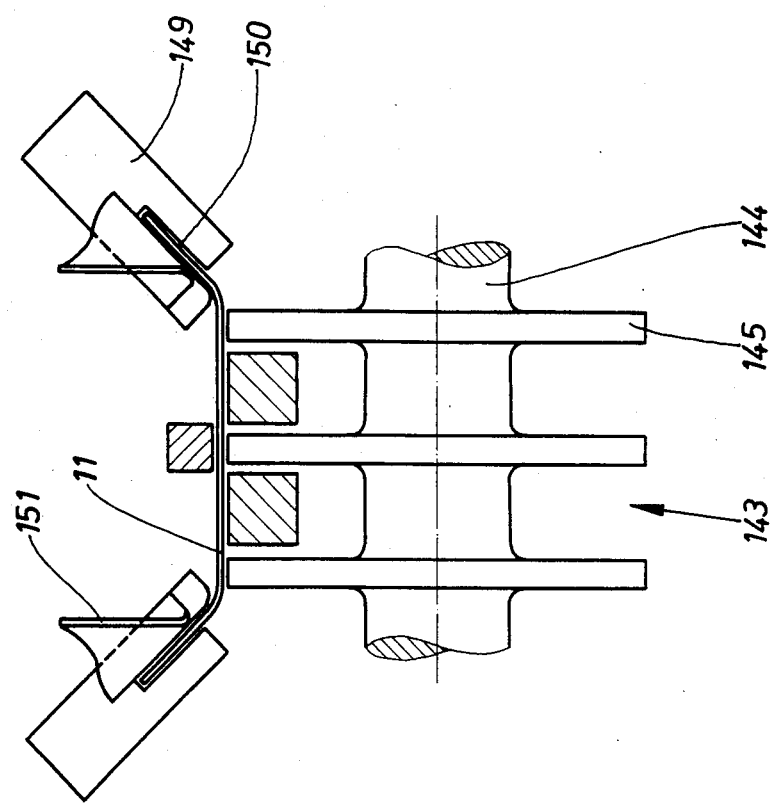
FIG. 18 shows a further transverse view or cross-section in the region of a mouth piece.
Figure 19:
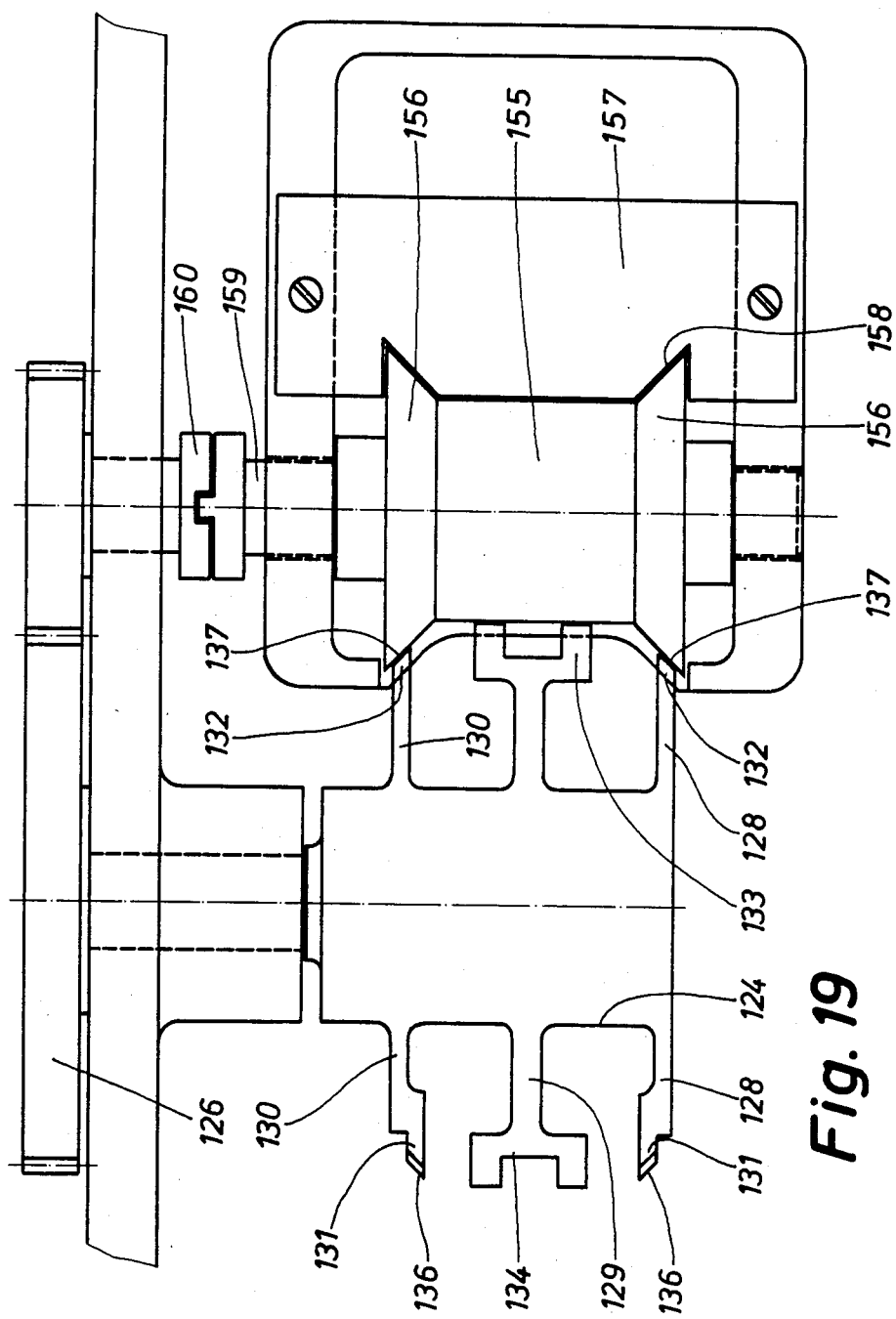
FIG. 19 shows a plan view of a detail of a glueing unit.

The blanks 11 preformed or prefolded in the stations described above are conveyed in the glueing station 120 on a pack track 138 directed obliquely downwards. This consists of a bottom guide 139, composed of two supporting bars arranged at a distance from one another (FIG. 18), and of a top guide 140 composed of a single guide bar offset relative to the bars of the bottom guide 139. The middle region of the blanks 11 is conveyed between these.

The blanks, after being shaped or prefolded, are first transported by the drawing pulleys 37, 38 at the end of the folding arrangement or at the entrance of the glueing station 120. Further drawing rollers 141 and 142 are arranged at the outlet of the glueing station 120 and serve for the further transport of the blanks. The distance between these drawing rollers 141, 142 and the drawing pulleys 37, 38 is less than the length of a blank 11.

Located opposite the glue roller 120, namely underneath the blanks 11, is a counter-roller 143. This consists of individual counter-discs 145 and 146 arranged on a common counter-shaft 144. The design, dimensions and arrangement of the counter-discs are co-ordinated with those of the supporting discs 128 to 130 or glue segments 131 to 134 of the glue roller 125, specifically in such a way that there are always glue segments 131 to 134 or their glue-coating surfaces 136, 137 arranged approximately centrally between two adjacent counter-discs 145, 146. The outer counter-discs 146 are arranged laterally next to the outer glue segments 131 and 132 and are provided with sloping or conical peripheral surfaces 147 for supporting the inclined side tabs 18, 19.

The glue roller 125 is preceded by a guide member for the blanks 11, namely a mouth piece 148. This consists of a mouth piece body 149 with inclined guide slots 150 for receiving and guiding the obliquely directed parts of the blank 11 (side tabs 18, 19, etc). The guide slots 150 lie in a plane of 45° corresponding to the position of the blank parts when glue is applied.

Guide means in the form of curved guide plates 151 lead to the guide slots 150. These guide plates 151 are designed and arranged in such a way that the lateral blank parts (side tabs 18, 19) erected during preforming are pressed into an angular position corresponding to the position of the guide slots 150. The guide plates 151 lead to the inlet side of the guide slots 150.

Located next to the glue roller 125 is a glueing unit 152. This consists of a glue pot 153 of a design known in principle. Mounted rotably in the glue pot 153 is a glue transfer roller 154. This is partially immersed in the glue located in the glue pot 153 and takes up a layer of glue on its surface. During the rotation of the glue roller 125, the glue segments 131 to 134 come in contact with the glue transfer roller 154 likewise driven to rotate, in such a way that glue can be transferred onto the glue-coating surfaces.

The glue transfer roller 154 is designed in the manner of a yarn reel to match the shape of the glue roller 125 or glue segments 131 to 134, namely with the cylindrical middle part 155 and lateral conical parts 156. The latter are provided with glue transfer surfaces directed approximately at 45°, corresponding to the glue-coating surfaces 136, 137 of the outer glue segments 131, 132.

Installed inside the glue pot 153 is a scraper 157. The contours of this match the shape of the glue transfer roller 154, namely having triangular recesses 158.

For cleaning purposes, the glue transfer roller 154 can be extracted from the glue pot 153. To achieve this, a drive shaft 159 of the glue transfer roller 154 is equipped with a coupling 160.

What is claimed is:

1. Process for producing cigarette hinge lid packages, having a pack part (13) and a lid (14), from one common longitudinally-extending blank (11) with areas for the forming of a front wall (15), a bottom wall (16), a rear wall (17) and narrow side walls from pack side tabs (18, 19) folded over each other, as well as a lid top wall (22), a lid front wall (23), a lid rear wall (21), and lid side walls from lid side tabs (26, 27) folded over each other, characterized by the following steps:
   fixing the spread-out blank (11) in a shaping station (31) by lowering a shaping plate (39, 95) from above onto the blank (11);
   choosing the shaping plate (39, 95) to have the total length of the front wall (15), bottom wall (16), rear wall (17), lid rear wall (21), top wall (22) and lid front wall (23) areas of the blank;
   after lowering of the shaping plate (39, 95) onto the blank (11), moving fixed longitudinally folding rollers (32, 33; 100, 101), rotatable about axes extending in the longitudinal direction of the blank (11) while resting against it, from a position below the shaping plate (39, 95) to a position around lateral shaping edges (40, 41 or 96, 97) of the shaping plate, and pressing the blank (11) against the shaping edges (40, 41 or 96, 97); and
   selecting the shaping edges (40, 41; 96, 97) to be rounded in an arc shape, or beveled.

2. Process for producing cigarette hinge lid packages, having a pack part (13) and a lid (14), from one common longitudinally extending blank (11) with areas for the forming of a front wall (15), a bottom wall (16), a rear wall (17) and narrow side walls from pack side tabs (18, 19) folded over each other, as well as of a lid top wall (22), a lid front wall (23), a lid rear wall (21), and lid side walls from lid side tabs (26, 27) folded over each other, characterized by the following steps:
   fixing the spread-out blank (11) in a shaping station (31) by lowering a shaping plate (39, 95) from above onto the blank (11);
   choosing the shaping plate (39, 95) to have the total length of the front wall (15), bottom wall (16), rear wall (17), lid rear wall (21), top wall (22) and lid front wall (23) areas of the blank;
   after lowering the shaping plate (39, 95) onto the blank (11), moving folding strips (103, 104) from a position below the shaping plate laterally against lateral shaping edges (96, 97) of the shaping plate, while taking along and shaping of the pack side tabs (18, 19) and the lid side tabs (26, 27) of the blank (11); and
   choosing the shaping edges (96, 97) to be rounded in an arc shape, or beveled.

3. Process according to claim 1 or 2, characterized by bending the side tabs (18, 19) and lid side tabs (27, 27), arranged on the two longitudinal sides of the front wall (15) and rear wall (17), beyond vertical 90° position.

4. Process according to claim 1 or 2, characterized in that, before shaping, coating the blank (11, 90) with glue and and subjecting it to heat during the production of the round edges at least in the region of the rounded or beveled edges to be produced (in the region of edge strips 29, 30 or blank strips 94).

5. Process according to claim 1 or 2, characterized by, in an inclined position of the side tabs (18, 19) and of the lid side tabs (26, 27), coating glue onto the side tabs and lid side tabs.

6. Process according to claim 1, characterized by moving the folding rollers (32, 33; 100, 101) simultaneously and synchronously by means of a common actuating drive (46).

7. Process according to claim 2, characterized by moving the folding strips (103, 104) simultaneously and synchronously by means of a common actuating drive (109).

8. Process according to claim 1 or 2, characterized in by, outside the shaping station (31), conveying the blanks (11, 90) by drawing rollers or pairs of drawing pulleys (35, 36; 37, 38) and having the blanks further out of the shaping station (31) by means of a separate conveying member acting intermittently.

9. Process according to claim 1 or 2, characterized by, following shaping by the shaping tools (32, 33; 100, 101; 103, 104; 39, 45), coating the blank (11) with glue in the region of a gluing station (120) by means of glue rolls (glue segments 131, 132, 133, 134).

10. Process according to claim 9, characterized by aligning the side tabs (18, 19) with obliquely directed guide slots (150), for the side tabs (18, 19) in the inclined position, by means of a mouthpiece (148) preceding a glue roller (125).

* * * * *